United States Patent [19]

Mericle

[11] 4,292,870

[45] Oct. 6, 1981

[54] GUIDE PLATE FOR WOOD WORKING TOOLS

[76] Inventor: John E. Mericle, 2202 Torrey Pines, Tucson, Ariz. 85710

[21] Appl. No.: 132,506

[22] Filed: Mar. 25, 1980

[51] Int. Cl.³ .............................................. B27B 5/18
[52] U.S. Cl. .................................... 83/471.2; 83/485; 83/477.2; 83/613; 83/574; 144/136 R; 144/134 R; 144/117 C
[58] Field of Search ..................... 83/435.1, 477.2, 581, 83/574, 471.2, 471.3, 477.1, 522, 485, 488, 613; 144/136 R, 134 R, 117 C; 269/87.1

[56] References Cited

U.S. PATENT DOCUMENTS

| | | | |
|---|---|---|---|
| 1,813,783 | 7/1931 | Tomlinson et al. | 83/574 |
| 2,956,597 | 10/1960 | Leitchner | 83/471.2 |
| 2,966,177 | 12/1960 | Weiskopf | 83/435.1 |
| 3,344,819 | 10/1967 | Mitchell | 83/477.2 |
| 4,068,550 | 1/1978 | Gray et al. | 83/477.2 |

Primary Examiner—Donald R. Schran
Attorney, Agent, or Firm—Cahill, Sutton & Thomas

[57] ABSTRACT

Multi-parallel channels of a guide plate support inset slidable tracks. A wood working tool is dependingly mounted to the tracks for translation past a workpiece temporarily fixedly secured to the guide plate and works the workpiece along a true line dictated by the sliding fit and translation of the tracks within the channels. In a variant, the wood working tool is positionally fixed to the guide plate and the workpiece, secured to tracks within the channels, is translated past the wood working tool to work a true line.

10 Claims, 6 Drawing Figures

GUIDE PLATE FOR WOOD WORKING TOOLS

The present invention relates to wood working tools and, more particularly, to a guide plate for effecting relative translatory movement along a true line between a wood working tool and a workpiece.

In wood working, precision cutting, such as sawing, notching, dadoing, etc., of a workpiece is often necessary. However, difficulty is encountered for such operation if the precision cutting must be done on a workpiece which does not have a flat surface or edge positionable adjacent an adjustable guide fence. Additionally, the workpiece surface which is available for cooperation with a guide fence may be quite irregular and may provide inadequate or unstable support. For example, many common types of wood, especially soft boards of pine, fir or spruce, may become severely warped by changes in temperature, humidity or merely by uneven pressures resulting from the manner in which the boards are stored. In order to avoid wasting of such warped and otherwise irregular boards, it is frequently necessary to rip them to provide boards which have precisely cut parallel opposite edges.

To rip warped and irregular boards, various techniques have been used. One technique has been simply to guide an irregular edge of the warped board along the fence of the table saw. Accomplishment of such ripping is made more difficult by the fence member of certain table saws in that many such fence members are securely mounted at only one end. These fence members may spring temporarily out of shape due to the forces impressed against them during ripping of a badly warped board. Moreover, the warped board may cause binding of the high speed cutting edge of a saw blade, resulting in heating and smoking of the wood. Frequently, the cutting edge of the saw blade is heated to such a high temperature that the saw blade metal looses its temper and the cutting edge quickly becomes dull. Once the saw blade uses its temper, it is useless and it cannot be resharpened satisfactorily. Worse yet, the saw blade may grasp or bite into the warped board and propel it with sufficient force to endanger the workmen and bystanders.

Another technique has been that of employing a joiner to precisely straighten one edge of the irregular board; subsequently, a circular saw and a fence member to guide the straightened edge may be used to rip the irregular board to a predetermined width. However, a suitable joiner is an expensive tool and may not be available. Moreover, the process of making multiple passes of the irregular edge on a joiner may be a very time consuming procedure and not justified in certain circumstances.

Another possible technique or solution to the problem is that of temporarily attaching (by clamping or nailing) a straight edge to the irregular board and pressing the temporary straight edge against the fence member of a power tool to guide the irregular edged board as it is moved past a cutting member. Again, this is an inconvenient and unwieldy precedure and has a detrimental effect of leaving permanent marks on the workpiece.

A very practical solution developed by the present applicant is described in U.S. Pat. Nos. 4,155,283 and 4,164,882. Herein, an elongated keying member, cooperating with a precision miter groove or guide member attached to the table supporting a cutting member guides the workpiece past the cutting member. With this device, fences or other guide means positioned opposite the side of the workpiece being cut are avoided. Moreover, the elongated keying member includes means for accommodating any length workpiece commensurate with the length of the elongated keying member itself.

Various other mechanisms have been utilized to secure a workpiece as it is moved past a rotary saw, as described and illustrated in U.S. Pat. Nos. 3,457,972 and 2,918,953. Variously configured fences used in conjunction with fixed rotary saws are well known but suffer from some or all of the above described problems. United States Patents illustrating various fences include U.S. Pat. Nos.: 3,344,819, 3,841,188, 3,905,263 and 4,026,173. Power tool guide means of various configurations are known, such as a pair of parallel racks supporting a router, as described in U.S. Pat. No. 3,866,496; a pair of parallel tracks supporting a handheld rotary saw in a predetermined alignment with an underlying workpiece is described in United States Patent No. 4,007,657; a saw guide positionable transverse to a workpiece is described in U.S. Pat. No. 3,935,777. A saw mounting mechanism for accommodating the weight of suspending a power saw beneath a lightweight work table without an attendant bowing of the table is described in U.S. Pat. No. 3,955,457.

All of these devices suffer from one or another detriment. In example, the utility is limited to one type of operation, a large number of moving parts, constraints are imposed upon workpiece sizes, special limited purpose cutting members are required, additional floor space is required with limited versatility and the devices are expensive with respect to the benefits achieved.

A primary object of the present invention is to provide apparatus for translating a workpiece and a cutting member relative to one another to make a true cut.

Another object of the present invention is to provide a common member for securing a workpiece and a cutting member during translatory movement therebetween.

Still another object of the present invention is to provide a guide plate for translating a cutting member past a workpiece affixed to the guide plate.

Yet another object of the present invention is to provide a guide plate for translating a workpiece past a cutting member rigidly affixed to the guide plate.

A further object of the present invention is to provide apparatus for cutting a true elongated straight edge in a workpiece with one pass of a cutting member.

A still further object of the present invention is to provide apparatus for cutting a straight edge in a workpiece irrespective of the configuration of any of the remaining edges of the workpiece.

A yet further object of the present invention is to provide an inexpensive guide plate for truing the edges of a workpiece.

A yet further object of the present invention is to provide a guide plate for translating a workpiece and cutting member past one another, which guide plate is supportable upon and detachably attachable to any convenient support element.

These and other objects of the present invention will become apparent to those skilled in the art as the description thereof proceeds.

The present invention will be described with greater specificity and clarity with reference to the following drawings, in which.

Figure 1:
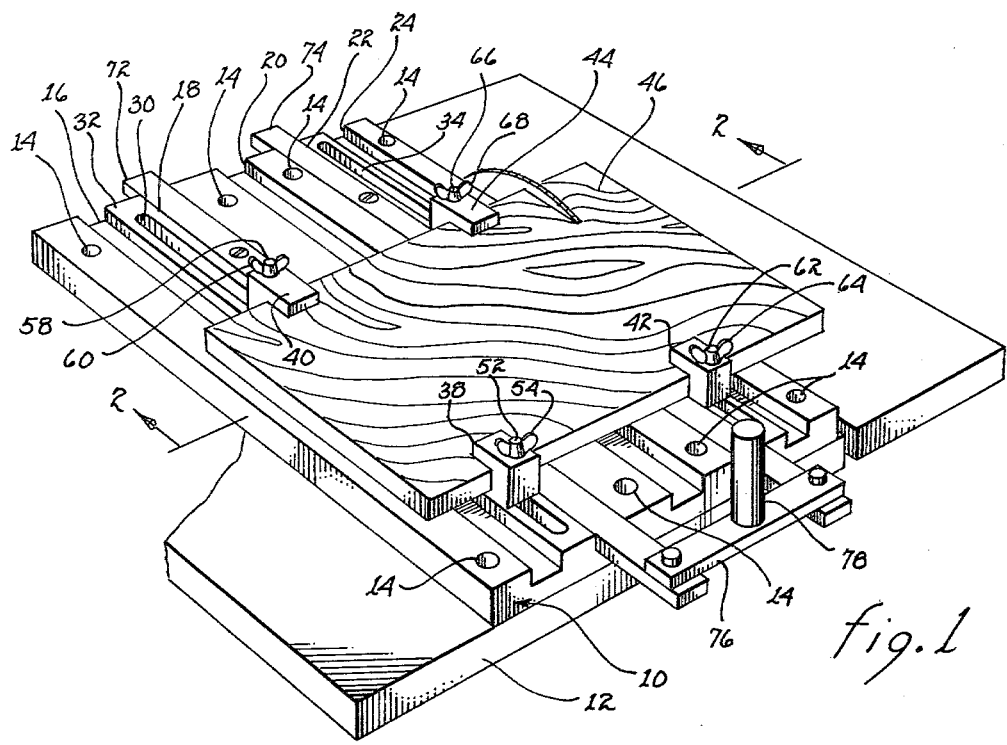
FIG. 1 is an isometric view of the present invention.
Figure 2:
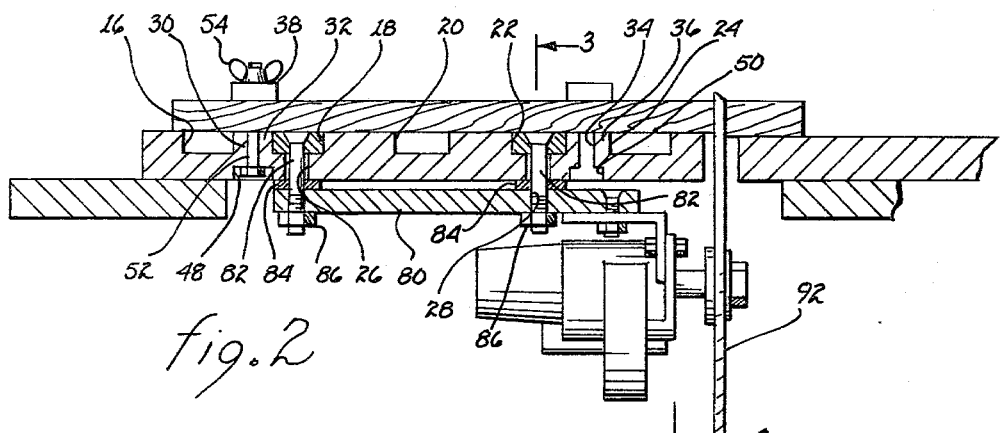
FIG. 2 is a cross-sectional view taken along lines 2—2, as shown in FIG. 1.
Figure 3:
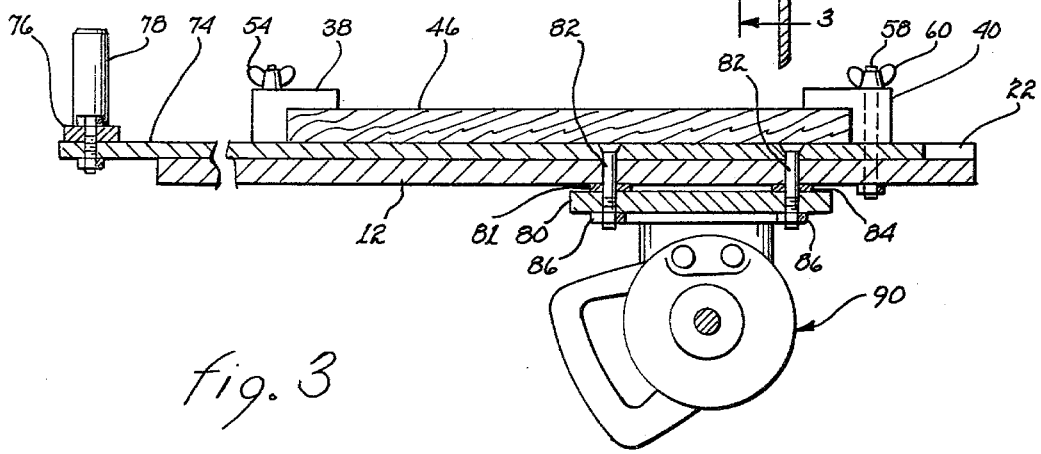
FIG. 3 is a cross-sectional view taken along lines 3—3, as shown in FIG. 2.

The structure and operation of the preferred embodiment of the present invention will be described with joint reference to FIGS. 1, 2 and 3. Guide plate 10 is attached to a support element 12 by countersunk screws or bolts extending through countersunk holes 14 disposed at each end of the guide plate. The support element may be a work table suitably modified with a cutout portion commensurate with the central part of the guide plate; in the alternative, the support element may comprise two transversely oriented braces, each brace being located in general vertical alignment with one of the sets of holes 14 at each end of guide plate 10. The guide plate defining an upper plane is preferably of metal to permit high tolerance machining of the guiding elements. A plurality of parallel high tolerance precision channels 16, 18, 20, 22 and 24 are machined in the guide plate for the full length of the guide plate. A slot 26 is machined in the bottom of channel 18 and extends for essentially but short of the full length thereof. A similar slot 28 is machined in channel 22 and also extends for essentially but short of the full length thereof. A slot 30 is machined in land 32 disposed intermediate channels 16 and 18; this slot extends for essentially but short of the full length of guide plate 10. A further slot 34 is machined in land 36 disposed intermediate channels 22 and 24; this slot also extends for essentially but short of the full length of guide plate 10. A recess 48 is disposed in the undersurface guide plate 10 longitudinally coincident with slot 30 and of somewhat greater width than the slot. A recess 50 is also disposed in the undersurface of the guide longitudinally coincident with slot 34.

Workpiece clamps 38, 40 and 42, 44 may be configured as inverted L-shaped clamps for bearing against the upper surface of a workpiece 46 to maintain it fixedly mounted upon guide plate 10. A bolt 52 extends upwardly from recess 48 through slot 30 into penetrating contact with clamp 38. A wing nut 54 threadedly engages the bolt and is used to draw the clamp toward the workpiece and exert a force upon the workpiece against the guide plate. A similar bolt 58 extends from recess 48 through slot 30 and wing nut 60 draws clamp 40 toward the workpiece and the guide plate. A bolt 62 extends upwardly from recess 50 through slot 34 for penetrable engagement with clamp 42. It is secured to the clamp by wing nut 64; similarly, bolt 66 is secured to the clamp by wing nut 64; similarly, bolt 66 is disposed in recess 50 of slot 34 to retain clamp 44 against the workpiece on threaded engagement with wing nut 68.

By inspection it is apparent that clamps 38, 40, 42 and 44 are positionable anywhere along their respective slots to accommodate any width of workpiece 46 to the extent permitted by these slots. Moreover, the heads of each of the bolts engaging the clamps will frictionally engage the respective recess to inhibit movement along the respective slots. Similarly, the downward force of the workpiece bearing against the guide plate and exerted by the clamps will inhibit relative movement between the workpiece and the guide plate. Thus, the workpiece is fixedly positionable upon the guide plate yet readily removable therefrom by loosening the wing nuts attendant the clamps.

It will also be evident that penetration of the workpiece surface by the clamps is not necessary: thus, the workpieces are not marred by the clamps. To further insure against marring of the workpiece by the clamps bearing against the surface thereof, inserts may be employed intermediate the clamping surface of the clamp and the workpiece to prevent direct contact therebetween and distribute the load imposed over a greater area of the workpiece.

Track 72 is disposed in and slidable along channel 18 in a tight but not binding fit. Track 74 is similarly disposed in channel 22. A cross-member 76 secures one end of these tracks to one another whereby translation of the cross-member in the axis of the channels will result in commensurate translation of the tracks. To effect facile manual translation, a handle 78 may be attached to the cross-member.

A plate 80 is suspended from tracks 72 and 74 by counter sunk bolts 82 depending from the tracks. Spacers 84 and nuts 86 maintain plate 80 adjacent to and in slidable engagement with the bottom surface of guide plate 10. Plate 80 serves as a mounting surface for a conventional rotary saw 90. The saw includes a circular saw blade 92 of sufficient diameter to extend above the top surface of guide plate 10 and provide sufficient cutting depth for a workpiece expected to be placed upon the guide plate. The size of the cutout mentioned above for the supporting element must be commensurate with the space requirements for translating saw 90 relative to the guide plate.

In operation, tracks 72 and 74 are pushed to the far end of guide plate 10 by manipulation of handle 78 to locate saw blade 92 at one side of the workpiece. A workpiece 46, which is to have a true straight edge cut therein, is secured to guide plate 10 by clamps 38, 40, 42 and 44. After energization of saw 90, handle 78 is drawn toward an operator, which motion results in translation of tracks 72 and 74 in their respective channels and commensurate movement of saw blade 92 toward and through the workpiece. Translation of the tracks is continued until the cut being made in the workpiece is complete. As pointed out above, workpiece 46 is essentially immoveable with respect to the guide plate. The close tolerance between tracks 72, 74 and their respective channels essentially precludes any play of saw 90 or saw blade 92 as translation of the saw is carried out. Accordingly, the cut made will be true and if a hollow ground blade is made, the smoothness of the cut will approximate the smooth edge available from a high quality joiner. It is to be understood that the above described translatory motion may be automated with power being drawn from saw 90 or separate power means.

Another function of guide plate 10 is that of providing a plurality of channels for receiving one of the elongated workpiece supporting members described in applicant's U.S. Pat. Nos. 4,155,283 and 4,164,882. For this use of guide plate 10, the guide plate may be inset within a conventional work table parallel to a rigidly mounted cutting member or parallel to the path of a movable mounting member. The elongated member translatable within the channels supports the workpiece and various width workpieces with respect to the cut to be made are readily accommodated by the plurality of spaced channels in the guide plate.

It may be further noted that saw 90 may be rigidly mounted to guide plate 10 through bolt means extending from plate 80 into threaded holes in the guide plate or into engagement with locking means. To effect relative translation between the saw and the workpiece, clamps 38, 40, 42, and 44 are attachable to slotted ones of tracks 72, 74 disposed in any pair of channels 16, 18, 20, 22 and 24. With this arrangement, the workpiece itself is translatable relative to the cutting member upon guide plate 10.

Figure 4:
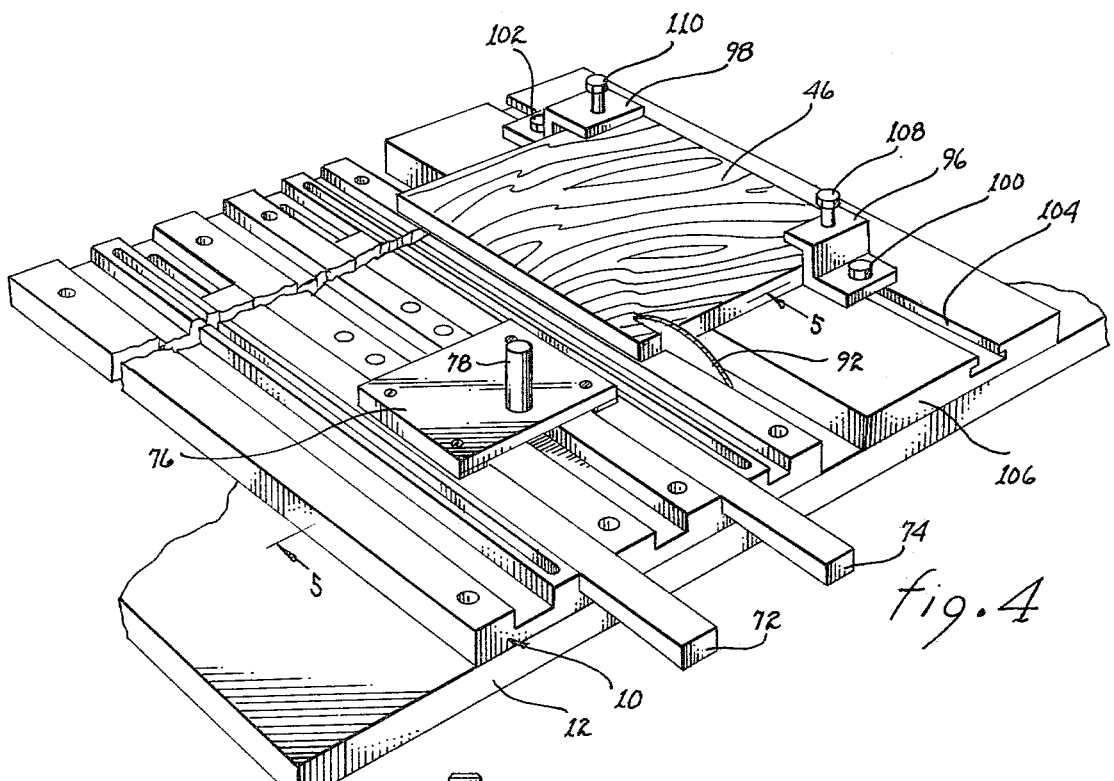
FIG. 4 illustrates a variant of the present invention.
Figure 5:
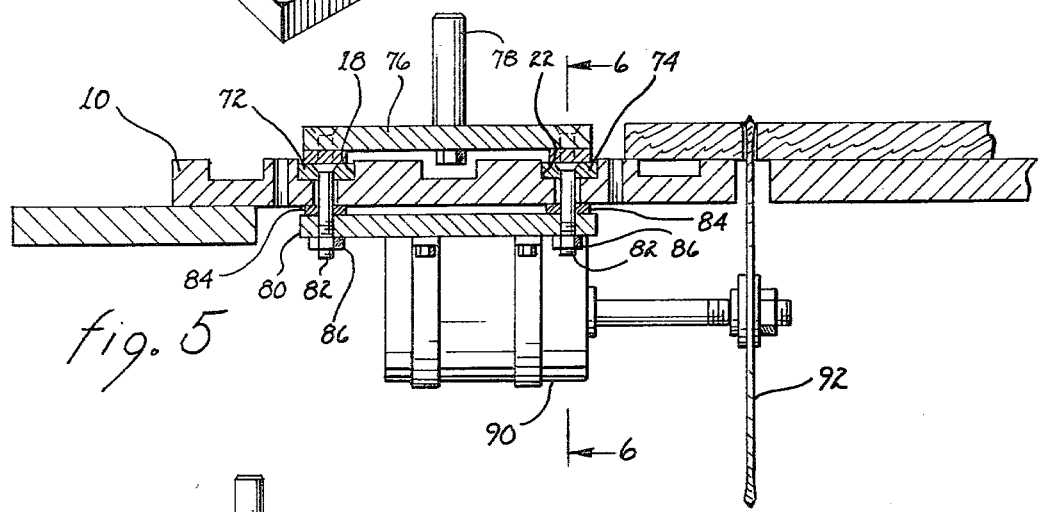
FIG. 5 is a cross-sectional view taken along lines 5—5, as shown in FIG. 4.
Figure 6:
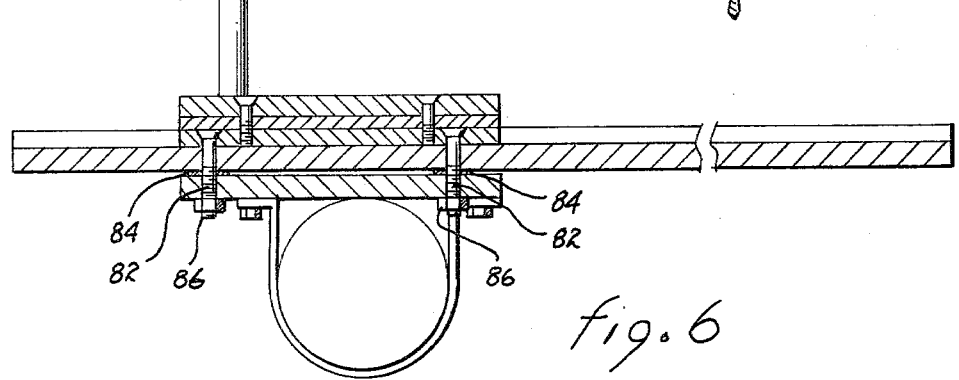
FIG. 6 is a cross-sectional view taken along lines 6—6, as shown in FIG. 5.

Referring jointly to FIGS. 4, 5 and 6, a variant of the present invention will be described. For the sake of clarity and simplicity, elements common to the embodiment shown in FIGS. 1, 2 and 3 will be identified with the same numerals. Guide plate 10, supported upon support element 12, guides translation of saw 90 and saw blade 92 past a workpiece 46. The saw depends from plate 80, which plate is attached to tracks 72, 74 disposed in channels 18, 22 by bolts 82, spacers 84 and nuts 86. Further spacers 94 are disposed intermediate the tracks and cross-member 76 to provide clearance of the cross-member with guide plate 10. A handle 78 is attached to the cross-member. Through the stabilizing force provided by tracks 72, 74 sliding within their respective channels accurate and precise translation of saw blade 92 along any path cut will be assured.

Workpiece 46 is secured by clamps 96, 98 lockable by bolts 100, 102 engaging undercut groove 104. The groove is disposed within a workpiece support member 106, which member is rigidly attached to support element 12 so as to align groove 104 with the channels of guide plate 10. Clamps 96, 98 may include thumb screws 108, 110, or the like, for exerting a force upon workpiece 46 to maintain it in fixed frictional contact with support member 106.

In operation, workpiece 46 is secured upon support member 106 by clamps 96 and 98 to align the cut to be made therein with the path of the blade; necessarily, cross-member 76 must first be translated so as to move saw blade 92 out of the way. After energization of saw 90, an operator may grasp handle 78 to translate the saw past the workpiece to make the cut. The close fit between tracks 72, 74 with the respective channels insures accurate translation of the saw blade along a plane commensurate with the cut to be made. Thereby, a fine edge, particularly if a hollow ground blade is used, will be achieved.

It is to be understood that the repositioning of the saw may be automated; the motive means therefor may be the saw itself or ancillary power means.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:

1. Apparatus for working a true line in a workpiece with a tool, said apparatus comprising in combination:
   (a) a guide plate defining an upper plane for guiding relative movement between the workpiece and the tool, said guide plate including a plurality of parallel channels and a slot disposed in each of at least two of said channels;
   (b) a pair of tracks for slidably engaging two slotted ones of said channels;
   (c) means for interconnecting said tracks to preclude relative movement therebetween;
   (d) means for suspending the tool and an attached working member from said pair of tracks through said slots to locate the working member in penetrable relationship with the upper plane for working the workpiece;
   (e) means for interconnecting said suspending means and said tracks to obtain translatory movement of the tool commensurate with translatory movement of said interconnecting means; and
   (f) means for positioning and maintaining the workpiece in fixed relationship to said guide plate and in interfering relationship to the working member;

whereby, upon translation of said pair of tracks under urging by said interconnecting means the working member of the tool works the workpiece along a true line with a precision commensurate with the degree of fit of said pair of tracks in said channels.

2. The apparatus as set forth in claim 1 wherein said positioning and maintaining means comprises:
   (a) at least two slots disposed in said guide plate;
   (b) clamps for clamping the workpiece upon said guide plate; and
   (c) means for securing said clamps to said slots at a location therealong commensurate with the size of the workpiece;

whereby, both the workpiece and the tool are keyed to said guide plate to enhance the trueness of work performed on the workpiece.

3. The apparatus as set forth in claim 2 wherein said guide plate includes means for supporting said guide plate in proximity to each end of said channels.

4. The apparatus as set forth in claim 1 wherein said suspending means comprises a plate spanning said track engaged slotted channels and means for attaching said plate through said slotted channels to said tracks.

5. The apparatus as set forth in claim 4 wherein the tool comprises a saw and wherein the working member comprises a circular saw blade extending through the upper plane.

6. The apparatus as set forth in claim 4 including spacer for preventing sliding contact between said plate and said guide plate.

7. The apparatus as set forth in claim 4 wherein said interconnecting means is disposed in proximity to a common end of said tracks.

8. The apparatus as set forth in claim 1 including a support element for supporting said positioning and maintaining means lateral to said guide plate.

9. The apparatus as set forth in claim 8 wherein said positioning and maintaining means includes a groove and means engaging said groove for clamping the workpiece to said support element in interfering relationship with translation of the working member of the tool.

10. The apparatus as set forth in claim 9 wherein said interconnecting means is disposed at other than the common ends of said tracks.

* * * * *